United States Patent
Xu et al.

(10) Patent No.: US 9,894,189 B2
(45) Date of Patent: Feb. 13, 2018

(54) METHOD AND APPARATUS FOR NETWORK COMMUNICATION USING A PHYSICAL LAYER (PHY) DATA FRAME HAVING A PHY HEADER THAT INCLUDES A DESTINATION ADDRESS FIELD

(71) Applicant: Texas Instruments Incorporated, Dallas, TX (US)

(72) Inventors: Gang Xu, Allen, TX (US); Ramanuja Vedantham, Allen, TX (US); Kumaran Vijayasankar, Allen, TX (US); Anand G. Dabak, Plano, TX (US); Tarkesh Pande, Richardson, TX (US); Il Han Kim, Allen, TX (US); Xiaolin Lu, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 15/419,045

(22) Filed: Jan. 30, 2017

(65) Prior Publication Data
US 2017/0142237 A1    May 18, 2017

Related U.S. Application Data

(63) Continuation of application No. 14/556,373, filed on Dec. 1, 2014, now Pat. No. 9,596,325, which is a continuation of application No. 13/528,667, filed on Jun. 20, 2012, now Pat. No. 8,929,398.

(60) Provisional application No. 61/498,884, filed on Jun. 20, 2011.

(51) Int. Cl.
*H04J 3/24* (2006.01)
*H04L 29/06* (2006.01)
*H04B 3/54* (2006.01)

(52) U.S. Cl.
CPC .............. *H04L 69/22* (2013.01); *H04B 3/54* (2013.01); *H04B 3/542* (2013.01)

(58) Field of Classification Search
None
See application file for complete search history.

(56) References Cited

U.S. PATENT DOCUMENTS

| | | | |
|---|---|---|---|
| 5,416,777 A | 5/1995 | Kirkham | |
| 7,599,353 B2 | 10/2009 | Kim et al. | |
| 8,614,961 B1 | 12/2013 | Katar et al. | |
| 2004/0240486 A1* | 12/2004 | Venkatesh | H04B 1/707 370/537 |

(Continued)

*Primary Examiner* — Edan Orgad
*Assistant Examiner* — Rebecca Song
(74) *Attorney, Agent, or Firm* — Kenneth Liu; Charles A. Brill; Frank D. Cimino

(57) ABSTRACT

In a disclosed embodiment, a method for communication in a network includes receiving, at a first device registered to the network, a physical layer (PHY) frame that includes a PHY header and a MAC header. The PHY frame may further include a MAC payload. The PHY header includes a destination address field. The method further includes comparing a network address of the first device to the destination address field to determine whether the destination address field stores a value having the same number of bits as the network address. When the comparison indicates that the value stored by the destination address field does not have the same number of bits as the network address, the method skips decoding the MAC header and the MAC payload.

18 Claims, 2 Drawing Sheets

(56) References Cited

U.S. PATENT DOCUMENTS

| | | | |
|---|---|---|---|
| 2005/0025080 A1* | 2/2005 | Liu | H04W 52/0229 370/311 |
| 2008/0068141 A1 | 3/2008 | Yokomitsu et al. | |
| 2010/0195569 A1* | 8/2010 | Matsushita | H04B 3/54 370/328 |
| 2015/0085881 A1 | 3/2015 | Xu et al. | |

* cited by examiner

METHOD AND APPARATUS FOR NETWORK COMMUNICATION USING A PHYSICAL LAYER (PHY) DATA FRAME HAVING A PHY HEADER THAT INCLUDES A DESTINATION ADDRESS FIELD

CROSS-REFERENCE TO RELATED APPLICATIONS

This application is a continuation of and claims priority to U.S. patent application Ser. No. 14/556,373, filed on Dec. 1, 2014, which is a continuation of and claims priority to U.S. patent application Ser. No. 13/528,667, filed on Jun. 20, 2012, now issued U.S. Pat. No. 8,929,398, which in turn claims the benefit of U.S. Provisional Application Ser. No. 61/498,884 filed Jun. 20, 2011. The aforementioned applications are all incorporated herein by reference in their entireties.

BACKGROUND

Disclosed embodiments relate generally to the field of powerline communications and, more specifically, to data frame structures for powerline communications.

This section is intended to introduce the reader to various aspects of art that may be related to various aspects of the subject matter described and/or claimed below. This discussion is believed to be helpful in providing the reader with background information to facilitate a better understanding of the various aspects of the present disclosure. Accordingly, it should be understood that these statements are to be read in this light, not as admissions of prior art.

Powerline communications (PLC) include systems for communicating data over the same medium (i.e., a wire or conductor) that is also used to transmit electric power to residences, buildings, and other premises. Once deployed, PLC systems may enable a wide array of applications, including, for example, automatic meter reading and load control (i.e., utility-type applications), automotive uses (e.g., charging electric cars), home automation (e.g., controlling appliances, lights, etc.), and/or computer networking (e.g., Internet access), to name only a few.

FIG. 1 shows the structure of a PHY data frame 100 for an Orthogonal Frequency-Division Multiplex (OFDM) physical layer (PHY) based on the IEEE 1901.2 standard including the various fields in the PHY header shown. For IEEE P1901.2, the PHY header is referred to as a frame control header (FCH). Data frame 100 includes a preamble 110, a FCH 120, a MAC header 130, a MAC (data) payload 140, and a FCS 150. Although not shown, the MAC header 130 includes a destination address field which is used by receiving nodes to determine if the frame received on the PLC channel is intended for that node or not. The FCH 120 does not include a destination address field.

The preamble 110 and FCH 120 are indicated as being ROBO mode modulation (Robust OFDM mode). ROBO modulation is considered robust in the sense that it may provide four times extra redundancy parity bits by using a repetition code and therefore the network may more reliably deliver data under severe channel conditions. FCH 120 includes fields including Phase Detection Counter (PDC) 121, Modulation type (MOD; such as 0 for ROBO; 1 for DBPSK and 2 for DQPSK) 122, Reserved (Rsrv) bits 123, delimiter type (DT) 124, frame length (FL; the PHY frame length in PHY symbols) 125, tone map (TM) 126 comprising TM [0:7] 126a, TM [8:15] 126b, TM [16:23] 126c, and TM [24:31] 126d, Frame Control Check Sequence (FCCS) 127, conv zeros (e.g., 6 zeros for convolutional encoder) 128, and Rsrv bits 129.

Since the PHY header in PLC standards, such as IEEE P1901.2 (e.g., FCH 120 in FIG. 1), does not include a destination address field, a node has to wait to decode the entire MAC header and MAC payload and the verification of the cyclic redundancy check (CRC) before knowing if it is the intended destination node (receiver) for the frame. Accordingly, the MAC header 130 is decoded only after the CRC verification is successful to determine if the frame is intended for that node or not. Moreover, known PLC specifications generally have no way to distinguish between corruption of the MAC header 130 and corruption of the MAC payload 140.

SUMMARY

Disclosed embodiments recognize PLC standards, such as IEEE P1901.2, that lack a destination address field in the PHY header, require received frames to be decoded fully (MAC header and MAC payload for data frames) and CRC verification passed before knowing if the node is the intended destination node (receiver) for the frame. This results in unnecessary power consumption when processing unintended frames. This frame processing flow also introduces ambiguity upon the transmission of an acknowledgement (ACK, such as a negative ACK or NACK) frame from a receiving node when the frame received is corrupted because it is possible that the destination address in the MAC header is corrupted and a node that is actually not the intended receiver may be the node transmitting the ACK.

Disclosed embodiments include data frames formatted to have the destination address in the PHY header. Since the destination address is in PHY header, this information can be used by the receiving node to decode only those frames that are intended for it. Decoding is thus performed only on intended frames, no longer on frames not intended for that node which are decoded in known PLC specifications, such as the IEEE P1901.2 specification, thus conserving power by no longer decoding unintended frames.

Moreover, unlike known PLC specifications, such as the IEEE P1901.2 specification, disclosed data frames having the destination address in the PHY header can identify MAC header corruption to enable distinguishing between MAC header corruption and MAC payload corruption. This enables sending a negative acknowledgment (NACK) only in the case of MAC payload corruption to eliminate node identity ambiguity upon the transmission of a NACK when the received frame is corrupted.

In accordance with one embodiment, a communication device includes a communication circuit that receives a physical layer (PHY) frame having a PHY header and a MAC header and MAC payload. The PHY header includes a destination address field that stores either an address value indicating a device registered to the network or a reserved value indicating a device not registered to the network. The communication device includes a memory storing instructions and a processor coupled to the memory and the communication circuit. The processor executes the instructions to cause the communication device to skip decoding the MAC header and MAC payload when the communication device is not registered to the network and the destination address field stores an address value indicating a device registered to the network or when the communication device is registered to the network and the destination address field stores the reserved value. The processor also executes instructions to cause the communication device to, when the communication device is registered to the network and the destination address field stores an address value indicating a device registered to the network, determine whether the stored address value matches an address value of the communication device, decode the MAC header and MAC payload when the address value of the communication device matches the stored address value, and skip decoding the MAC header and MAC payload when the address value of the communication device does not match the stored address value.

In accordance with another embodiment, a method for communication in a network includes receiving, at a first device, a physical layer (PHY) frame sent by a second device on the network. The PHY frame has a PHY header and a MAC header, and the PHY header includes a destination address field. The method includes comparing a network address of the first device to the destination address field of the PHY frame and, when the comparison indicates that the destination address field stores an address value for a device registered to the network that matches the network address of the first device, decoding the MAC header of the PHY frame.

In accordance with yet another embodiment, a method for communication in a network includes receiving, at a first device registered to the network, a physical layer (PHY) frame that includes a PHY header, a MAC header, and a MAC payload. The PHY header includes a destination address field. The method further includes comparing a network address of the first device to the destination address field to determine whether the destination address field stores a value having the same number of bits as the network address. When the comparison indicates that the value stored by the destination address field does not have the same number of bits as the network address, the method skips decoding the MAC header and the MAC payload.

BRIEF DESCRIPTION OF THE DRAWINGS

Reference will now be made to the accompanying drawings, which are not necessarily drawn to scale, wherein.

DETAILED DESCRIPTION

Disclosed embodiments now will be described more fully hereinafter with reference to the accompanying drawings. Such embodiments may, however, be embodied in many different forms and should not be construed as limited to the embodiments set forth herein. Rather, these embodiments are provided so that this disclosure will be thorough and complete, and will fully convey the scope of this disclosure to those having ordinary skill in the art. One having ordinary skill in the art may be able to use the various disclosed embodiments and there equivalents. As used herein, the term "couple" or "couples" is intended to mean either an indirect or direct electrical connection. Thus, if a first device couples to a second device, that connection may be through a direct electrical connection, or through an indirect electrical connection via other devices and connections.

As described above, for PLC standards such as IEEE P1901.2, the MAC header in the frame is decoded only after the CRC verification is successful to determine if the frame is intended for that node or not. This can be an expensive and energy consuming operation that is performed on every frame, including frames not intended for that node. Also, some PLC standards, such as IEEE P1901.2, require a destination node to send a NACK if the MAC CRC failed, which introduces ambiguity in the transmission of NACK when the received MAC frame is corrupted since it is possible that the destination address in the MAC header is corrupted and a node that is not the intended receiver may be the node transmitting the NACK. The problem arises because the MAC CRC protects both the header and the payload of the MAC frame, so it is possible that the destination address field is corrupted when the CRC has failed.

Figure 1:
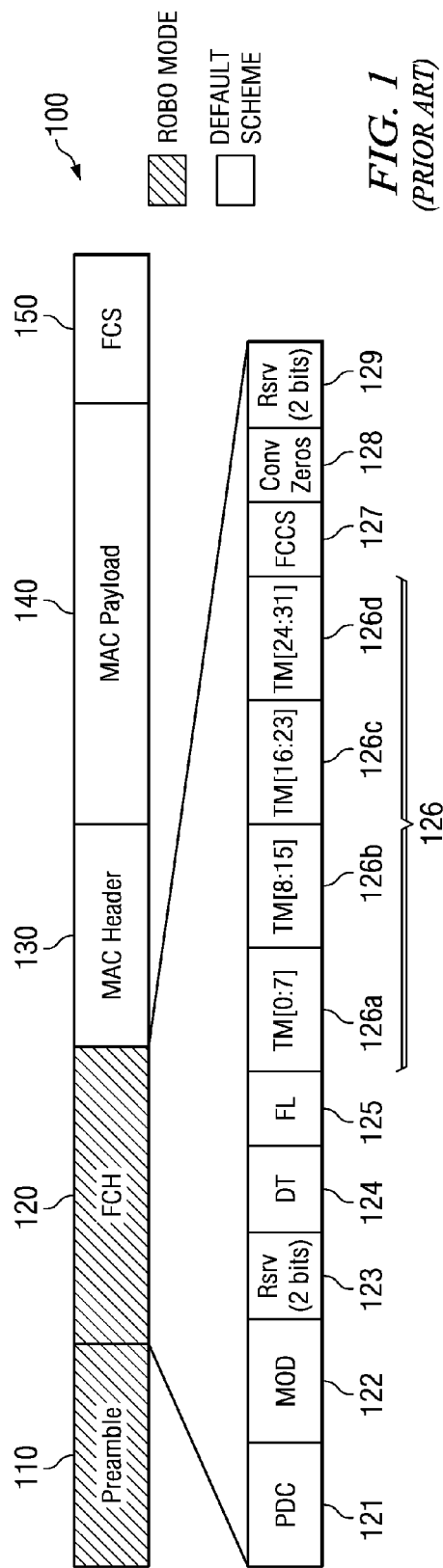
FIG. 1 shows the structure of a PHY data frame based on the IEEE P1901.2 standard showing the various fields in its PHY header (a FCH).

Disclosed PHY data frames having a destination address within the PHY header solve the above problems, and also eliminate node identity ambiguity upon the transmission of a NACK when the received frame is corrupted. In one embodiment, a destination address field (e.g., a 2-byte field) is added inside the PHY Header (e.g., FCH in case of IEEE P1901.2) for all data frames, but not for non-data frames such as ACK frames. The DT field (see DT 124 in FIG. 1 and FIG. 2 described below) allows uniquely identifying ACK/NACK frames from data frames, and data frames can also be distinguished from ACK/NACK frames based on the destination address field in disclosed data frames.

If the network address of the receiving node does not match the destination address in the PHY header of the received data frame, the receiving node can skip the decoding of the entire MAC Header 130 and MAC payload 140 thus providing considerable power savings. Disclosed embodiments allow for nodes to transmit the NACK frame only if the destination address in the PHY header matches its own address, even if the data frame is corrupted (corrupted MAC header and/or payload).

In one embodiment the data frame sent by the first node includes a reserved destination address field set to a reserved value in the PHY header for nodes in the PLC network that use an extended address which are not yet registered to the PLC network. The second node when registered to the PLC network uses the reserved destination address field to skip decoding of the data frame. Since nodes in the network that are registered to the network will have a shorter address, all registered nodes can skip the decoding of the entire MAC header and MAC payload if this reserved value is in the PHY Header. This embodiment thus allows nodes that are part of the network to skip the decoding of frames intended for nodes trying to join the network.

Figure 2:
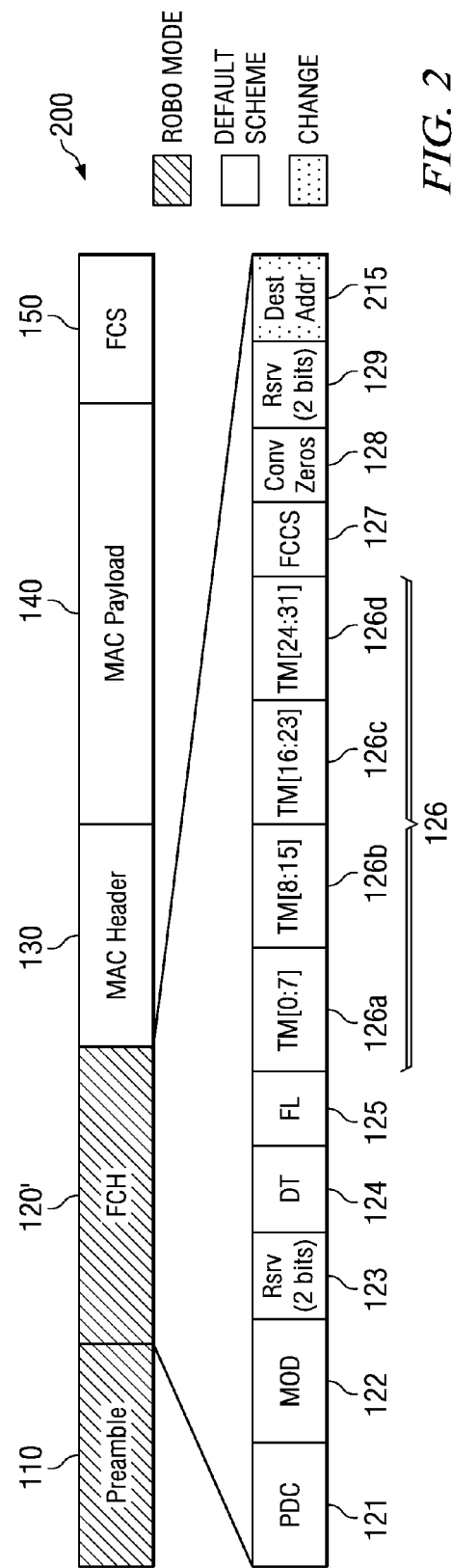
FIG. 2 shows the structure of an example PHY data frame having a destination address within the PHY header, according to an example embodiment.

FIG. 2 shows the structure of an example data frame 200 having a destination address field 215 within the PHY header, according to an example embodiment. The PHY header is shown as FCH 120' (based on IEEE P1901.2 nomenclature) to distinguish from FCH 120 in FIG. 1 which lacks a disclosed destination address field 215. Data frame 200 includes the fields shown for data frame 100 in FIG. 1, along with an added destination address field 215 which in the embodiment shown is placed after the DT field 124. Since the DT field 124 can be parsed before the destination address field 215 to identify ACK/NACK frames and thus distinguish ACK/NACK frames from data frames, the receiver node can look for the destination address field 215 only for data frames.

In addition, since the destination address field 215 is included in FCH 120', this address information can be encoded with the ROBO modulation scheme (Robust OFDM). ROBO modulation is robust in the sense that it may provide four times extra redundancy parity bits by mean of repetition code and therefore the system may reliably deliver data under severe channel conditions.

Figure 3:
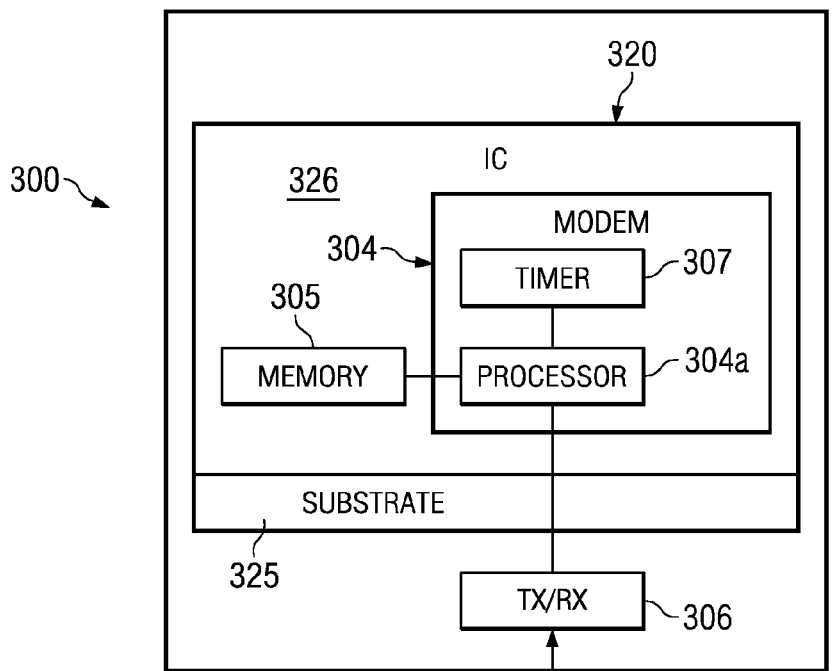
FIG. 3 is a block diagram schematic of a communication device having a disclosed modem that runs a disclosed algorithm which implements compiling of PHY data frames including a destination address in the PHY header for powerline communications, according to an example embodiment.

FIG. 3 is a block diagram schematic of a communication device 300 having a disclosed modem 304 that runs a disclosed frame compiling algorithm which implements compiling of data frames including a destination address in the PHY header for powerline communications, according to an example embodiment. Communication device 300 is for communications at a first node on a PLC channel in a PLC network including at least a second node. Communications device 300 can be used at a service node (which includes switch nodes and terminal nodes) or a base (data concentrator) node in the PLC communications network.

Modem 304 includes a processor (e.g., a digital signal processor, (DSP)) 304a coupled to an associated memory 305 that that stores a disclosed frame compiling algorithm which provides code for compiling frames including PHY data frames having a destination address in the PHY header. Memory 305 comprises machine readable storage, for example, static random-access memory (SRAM). The processor 304a is programmed to implement a disclosed frame compiling algorithm. Modem 304 includes a timer 307, such as for ACK transmission, Carrier Sense Multiple Access/collision avoidance (CSMA)/CA) back-off and data transmission purposes.

The PLC transceiver (TX/RX) 306 is communicably coupled to the modem 304 for coupling of the communications device 300 to the shared powerline 340. Transceiver 306 facilitates communications with other SNs and the BN on the powerline 340.

The modem 304 is shown formed on an integrated circuit (IC) 320 comprising a substrate 325 having a semiconductor surface 326, such as a silicon surface. Memory 305 may be included on the IC 320. In another embodiment the modem 304 is implemented using 2 processor chips, such as 2 DSP chips. Besides the DSP noted above, the processor 304a can comprise a desktop computer, laptop computer, cellular phone, smart phone, or an application specific integrated circuit (ASIC).

Disclosed modems 304 and disclosed communications devices 300 can be used in a PLC network to provide a networked device that in service is connected to a powerline via a power cord. In general, the "networked device" can be any equipment that is capable of transmitting and/or receiving information over a powerline. Examples of different types of networked devices include, but are not limited or restricted to a computer, a router, an access point (AP), a wireless meter, a networked appliance, an adapter, or any device supporting connectivity to a wired or wireless network.

Figure 4:
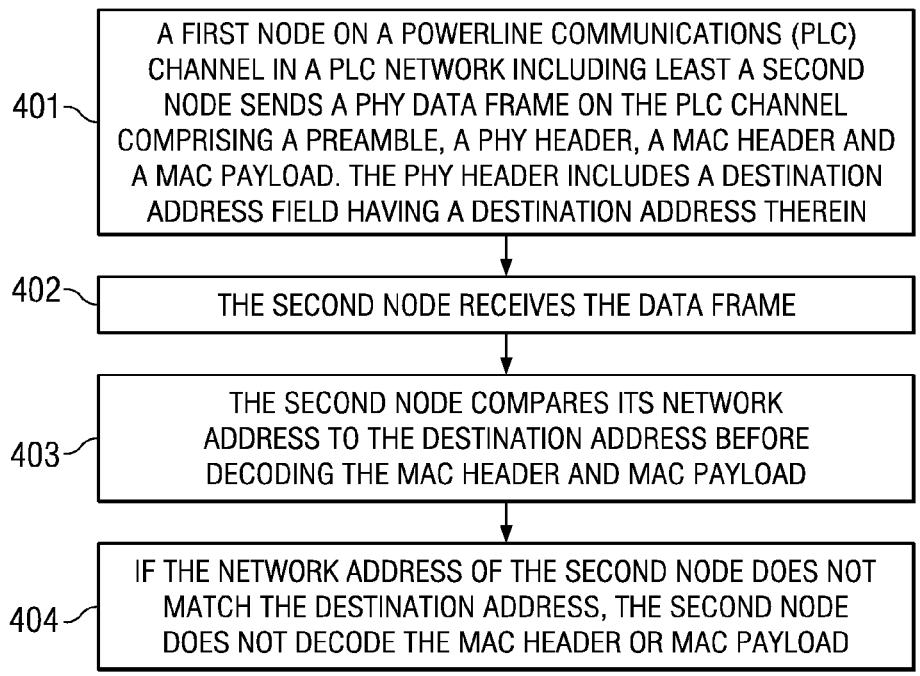
FIG. 4 is a flowchart for an example method of powerline communications using PHY data frames having a destination address within the PHY header, according to an example embodiment.

FIG. 4 is a flowchart for an example method of powerline communications in a PLC network including a first node and at least a second node on a PLC channel using data frames having a destination address within the PHY header. In step 401, the first node sends a data frame on the PLC channel comprising a preamble, a PHY header, a MAC header and a MAC payload. The PHY header includes a destination address field having a destination address therein, such as a 2 byte address field. In step 402, the second node receives the data frame. In step 403 the second node compares its network address to the destination address before decoding the MAC header and MAC payload. In step 404, if the network address of the second node does not match the destination address, the second node does not decode the MAC header or MAC payload.

All non-data frames (e.g., ACK, NACK) used in the PLC network can exclude a destination address field in their PHY headers. The destination address field can be after the DT field in the data frame, which allows the second node to not parse for a destination address field of a received frame if the DT field of the received frame indicates a non-data frame. The PHY header including the destination address field can be encoded with a ROBO modulation scheme which includes a repetition code, making the destination address information more robust.

The second node can transmit a NACK frame responsive to the data frame received only if the destination address matches the network address. In this embodiment, if at least one of the MAC header and MAC payload are corrupted, the second node can still transmit the NACK frame responsive to the data frame.

As described above, in one embodiment, the data frame sent by the first node includes a reserved destination address field set to a reserved value in the PHY header for nodes in the PLC network that use an extended address which are not yet registered to the PLC network. The second node when registered to the PLC network uses information in the reserved destination address field to skip decoding of the data frame. Since nodes in the network that are registered to the network will have a shorter address, all registered nodes can skip decoding of the entire MAC header and MAC payload if this reserved value is in the PHY Header. This embodiment allows nodes that already part of the network to skip the decoding of frames intended for nodes trying to join the network.

Many modifications and other embodiments of the invention will come to mind to one skilled in the art to which this Disclosure pertains having the benefit of the teachings presented in the foregoing descriptions, and the associated drawings. Therefore, it is to be understood that embodiments of the invention are not to be limited to the specific embodiments disclosed. Although specific terms are employed herein, they are used in a generic and descriptive sense only and not for purposes of limitation.

What is claimed is:

1. A communication device comprising:
    a communication circuit that receives from a network, a physical layer (PHY) frame having a PHY header, a MAC header, and a MAC payload, wherein the PHY header includes a destination address field, the destination address field containing either an address value indicating a device registered to the network or a reserved value indicating a device not registered to the network;
    a memory storing instructions; and
    a processor coupled to the memory and the communication circuit, the processor executing the instructions to cause the communication device to:
        when the communication device is not registered to the network and the destination address field contains an address value indicating a device registered to the network or when the communication device is registered to the network and the destination address field contains the reserved value, not decode the MAC header and the MAC payload; and when the communication device is registered to the network and the destination address field contains an address value indicating a device registered to the network, determine whether the address value matches an address value of the communication device, decode the MAC header and the MAC payload when the address value of the communication device matches the address value, and not decode the MAC header and the MAC payload when the address value of the communication device does not match the address value.

2. The communication device as claimed in claim 1, wherein the network is a power line communication (PLC) network and the communication circuit is a PLC transceiver.

3. The communication device as claimed in claim 1, wherein the received PHY frame is sent from another communication device on the network.

4. The communication device as claimed in claim 1, wherein an address value indicating a device registered to the network has a first length and the reserved value indicating a device not registered to the network has a second length.

5. The communication device as claimed in claim 4, wherein the second length is greater than the first length.

6. The communication device as claimed in claim 5, wherein not decoding the MAC header and the MAC payload when the communication device is not registered to the network and the destination address field contains an address value indicating a device registered to the network or when the communication device is registered to the network and the destination address field contains the reserved value is at least partially responsive to determining that the address value of the communication device and the value contained in the destination address field have different lengths.

7. The communication device as claimed in claim 1, wherein, when the address value of the communication device matches the address value contained in the destination address field, the processor executes instructions perform a cyclic redundancy check (CRC) verification on the MAC header and the MAC payload prior to the decoding.

8. The communication device as claimed in claim 7, wherein the decoding is performed when the CRC verification is successful and is not performed when the CRC verification fails.

9. The communication device as claimed in claim 8, wherein the processor executes instructions to send a negative acknowledgement (NACK) when the CRC verification fails and an acknowledgement (ACK) when the CRC verification passes.

10. The communication device as claimed in claim 1, wherein the PHY frame includes in the PHY header a delimiter type (DT) field located prior to the destination address field and indicating whether the PHY frame contains data or non-data, wherein the destination address field is not read by the processor when the DT field indicates that the PHY frame contains non-data.

11. A method for communication in a network, the method comprising:
receiving at a first device a physical layer (PHY) frame sent by a second device on the network, the PHY frame having a PHY header and a MAC header, wherein the PHY header includes a destination address field;
comparing a network address of the first device to the destination address field of the PHY frame;

when the comparison indicates that the destination address field contains an address value for a device registered to the network that matches the network address of the first device, decoding the MAC header of the PHY frame; and when the comparison indicates that the destination address field contains an address value for a device registered to the network but does not match the network address of the first device or indicates that the destination address field contains a reserved value for a device not registered to the network and the first device is registered to the network, not decoding the MAC header of the PHY frame;

wherein an address value for a device registered to the network and the reserved value are indicated by a different number of bits, and wherein the comparison indicating that the destination address field contains the reserved value and the first device is registered to the network is at least partially the result of determining that the number of bits indicated by the destination address field differs from the number of bits of the network address of the first device.

12. The method as claimed in claim 11, wherein the network comprises a power line communication (PLC) network and the first and second devices comprise PLC devices on the PLC network.

13. The method as claimed in claim 11, wherein the reserved value is indicated by more bits than the address value.

14. The method as claimed in claim 11, wherein, when the comparison indicates that the destination address field contains an address value that matches the network address of the first device, performing a cyclic redundancy check (CRC) verification on the MAC header prior to the decoding.

15. A method for communication in a network, the method comprising:
receiving, at a first device that is registered to the network, a physical layer (PHY) frame, the PHY frame having a PHY header, a MAC header, and a MAC payload wherein the PHY header includes a destination address field;
comparing a network address of the first device to the destination address field of the received PHY frame to determine whether the destination address field contains a value having the same number of bits as the network address; and
when the comparison indicates that the value contained in the destination address field does not have the same number of bits as the network address, not decoding the MAC header and the MAC payload of the received PHY frame;
wherein, when the destination address field contains a value having a different number of bits than the network address, the value is a predetermined value indicating that the PHY frame is intended for a device not registered to the network.

16. The method as claimed in claim 15, comprising:
when the comparison indicates that the value contained in the destination address field has the same number of bits as the network address, determining whether the value contained in the destination address field matches the network address;
decoding the MAC header and the MAC payload when the value contained in the destination address field matches the network address; and not decoding the MAC header and the MAC payload when the value contained in the destination address field does not match the network address.

17. The method as claimed in claim 15, wherein the network comprises a power line communication (PLC) network and the first device comprise a PLC device connected to the PLC network.

18. The method as claimed in claim 15, wherein the predetermined value has a greater number of bits than the network address of the first device.

* * * * *